US008771879B2

(12) United States Patent
Gordon et al.

(10) Patent No.: US 8,771,879 B2
(45) Date of Patent: Jul. 8, 2014

(54) LITHIUM—SULFUR BATTERY WITH A SUBSTANTIALLY NON-POROUS LISICON MEMBRANE AND POROUS LISICON LAYER

(75) Inventors: John Howard Gordon, Salt Lake City, UT (US); John Joseph Watkins, West Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 203 days.

(21) Appl. No.: 12/205,759

(22) Filed: Sep. 5, 2008

(65) Prior Publication Data

US 2009/0061288 A1 Mar. 5, 2009

Related U.S. Application Data

(60) Provisional application No. 60/970,178, filed on Sep. 5, 2007.

(51) Int. Cl.
*H01M 4/136* (2010.01)
*H01M 4/62* (2006.01)
*H01M 10/0562* (2010.01)
*H01M 10/44* (2006.01)

(52) U.S. Cl.
USPC ............ 429/231.95; 429/50; 429/218.1; 429/247; 429/322; 429/342

(58) Field of Classification Search
USPC ............ 429/50, 218.1, 231.95, 247, 322, 342
See application file for complete search history.

(56) References Cited

U.S. PATENT DOCUMENTS

| 1,501,756 A | 7/1924 | Downs |
| 3,660,170 A | 5/1972 | Rampel |
| 3,785,965 A | 1/1974 | Welty |
| 3,787,315 A | 1/1974 | Bearden, Jr. et al. |
| 3,788,978 A | 1/1974 | Bearden, Jr. et al. |
| 3,791,966 A | 2/1974 | Bearden |

(Continued)

FOREIGN PATENT DOCUMENTS

| JP | 5975985 | 4/1984 |
| JP | 62186470 | 8/1987 |

(Continued)

OTHER PUBLICATIONS

Sumathipala, et al., "Novel Li+ Ion Conductors and Mixed Conductors, Li3+xSixCr1-xO4 and a Simple Method for Estimating Li+/e− Transport Numbers", *J. Electrochem. Soc.*, vol. 142, No. 7,(Jul. 1995),2138-2143.

(Continued)

*Primary Examiner* — Sean P Cullen
(74) *Attorney, Agent, or Firm* — David Fonda

(57) ABSTRACT

A lithium-sulfur battery is disclosed in one embodiment of the invention as including an anode containing lithium and a cathode comprising elemental sulfur. The cathode may include at least one solvent selected to at least partially dissolve the elemental sulfur and $Li_2S_x$. A substantially non-porous lithium-ion-conductive membrane is provided between the anode and the cathode to keep sulfur or other reactive species from migrating therebetween. In certain embodiments, the lithium-sulfur battery may include a separator between the anode and the non-porous lithium-ion-conductive membrane. This separator may prevent the lithium in the anode from reacting with the non-porous lithium-ion-conductive membrane. In certain embodiments, the separator is a porous separator infiltrated with a lithium-ion-conductive electrolyte.

10 Claims, 5 Drawing Sheets

(56) References Cited

U.S. PATENT DOCUMENTS

| | | |
|---|---|---|
| 3,970,472 A | 7/1976 | Steffensen |
| 4,041,215 A | 8/1977 | Kormanyos et al. |
| 4,053,371 A | 10/1977 | Towsley et al. |
| 4,076,613 A | 2/1978 | Bearden, Jr. |
| 4,182,797 A | 1/1980 | Kondo et al. |
| 4,207,391 A | 6/1980 | Church et al. |
| 4,244,986 A | 1/1981 | Paruso et al. |
| 4,298,666 A | 11/1981 | Taskier |
| 4,307,164 A | 12/1981 | Church et al. |
| 4,372,823 A | 2/1983 | Church et al. |
| 4,465,744 A | 8/1984 | Susman et al. |
| 4,479,856 A | 10/1984 | Ando |
| 4,542,444 A | 9/1985 | Boland |
| 4,546,055 A | 10/1985 | Coetzer et al. |
| 4,623,597 A | 11/1986 | Sapru et al. |
| 4,828,939 A | 5/1989 | Turley et al. |
| 4,842,963 A | 6/1989 | Ross, Jr. et al. |
| 4,937,155 A | 6/1990 | Tokoi et al. |
| 5,057,206 A | 10/1991 | Engel et al. |
| 5,213,908 A | 5/1993 | Hagedorn |
| 5,290,405 A | 3/1994 | Joshi et al. |
| 5,342,709 A | 8/1994 | Yahnke et al. |
| 5,427,873 A | 6/1995 | Shuster |
| 5,516,598 A | 5/1996 | Visco et al. |
| 5,525,442 A | 6/1996 | Shuster |
| 5,541,019 A | 7/1996 | Anani et al. |
| 5,580,430 A | 12/1996 | Balagopal et al. |
| 5,686,201 A | 11/1997 | Chu |
| 5,695,632 A | 12/1997 | Brons et al. |
| 5,780,186 A | 7/1998 | Casey, Jr. |
| 5,814,420 A * | 9/1998 | Chu .................. 429/104 |
| 5,856,047 A | 1/1999 | Venkatesan et al. |
| 5,882,812 A | 3/1999 | Visco et al. |
| 5,935,421 A | 8/1999 | Brons et al. |
| 6,017,651 A | 1/2000 | Nimon et al. |
| 6,025,094 A | 2/2000 | Visco et al. |
| 6,030,720 A | 2/2000 | Chu et al. |
| 6,033,343 A | 3/2000 | Licht |
| 6,110,236 A | 8/2000 | Tsang et al. |
| 6,153,328 A | 11/2000 | Colborn |
| 6,159,634 A | 12/2000 | Yen et al. |
| 6,165,644 A | 12/2000 | Nimon et al. |
| 6,200,704 B1 | 3/2001 | Katz et al. |
| 6,210,564 B1 | 4/2001 | Brons et al. |
| 6,210,832 B1 | 4/2001 | Visco et al. |
| 6,214,061 B1 | 4/2001 | Visco et al. |
| 6,225,002 B1 | 5/2001 | Nimon et al. |
| 6,248,476 B1 | 6/2001 | Sun et al. |
| 6,248,481 B1 | 6/2001 | Visco et al. |
| 6,265,100 B1 | 7/2001 | Saaski et al. |
| 6,291,090 B1 | 9/2001 | Kuznetsov et al. |
| 6,310,960 B1 | 10/2001 | Saaski et al. |
| 6,355,379 B1 | 3/2002 | Ohshita et al. |
| 6,358,643 B1 | 3/2002 | Katz et al. |
| 6,368,486 B1 | 4/2002 | Thompson et al. |
| 6,376,123 B1 * | 4/2002 | Chu .................. 429/104 |
| 6,402,795 B1 | 6/2002 | Chu et al. |
| 6,413,284 B1 | 7/2002 | Chu et al. |
| 6,413,285 B1 | 7/2002 | Chu et al. |
| 6,416,903 B1 | 7/2002 | Fierro et al. |
| 6,432,584 B1 | 8/2002 | Visco et al. |
| 6,537,701 B1 | 3/2003 | Nimon et al. |
| 6,610,440 B1 | 8/2003 | LaFollette et al. |
| 6,632,573 B1 | 10/2003 | Nimon et al. |
| 6,737,197 B2 | 5/2004 | Chu et al. |
| 6,787,019 B2 | 9/2004 | Jacobson et al. |
| 6,852,450 B2 | 2/2005 | Hwang et al. |
| 6,881,234 B2 | 4/2005 | Towsley |
| 6,911,280 B1 | 6/2005 | De Jonghe et al. |
| 6,955,753 B1 | 10/2005 | Gomez |
| 6,955,866 B2 | 10/2005 | Nimon et al. |
| 6,991,662 B2 | 1/2006 | Visco et al. |
| 7,070,632 B1 | 7/2006 | Visco et al. |
| 7,144,654 B2 | 12/2006 | LaFollette et al. |
| 7,166,384 B2 | 1/2007 | LaFollette et al. |
| 7,214,443 B2 | 5/2007 | Clarke et al. |
| 7,259,126 B2 | 8/2007 | Gordon et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,432,017 B2 | 10/2008 | Visco et al. |
| 7,482,096 B2 | 1/2009 | De Jonghe et al. |
| 7,491,458 B2 | 2/2009 | Visco et al. |
| 8,012,621 B2 | 9/2011 | Joshi et al. |
| 8,088,270 B2 | 1/2012 | Gordon et al. |
| 2002/0150818 A1 | 10/2002 | Amatucci et al. |
| 2003/0108788 A1 | 6/2003 | Miyoshi et al. |
| 2004/0142244 A1 * | 7/2004 | Visco et al. .................. 429/246 |
| 2004/0197641 A1 | 10/2004 | Visco et al. |
| 2004/0229107 A1 | 11/2004 | Smedley |
| 2005/0109617 A1 | 5/2005 | Ono et al. |
| 2005/0175894 A1 | 8/2005 | Visco et al. |
| 2006/0096893 A1 | 5/2006 | De Almeida et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |
| 2007/0048610 A1 | 3/2007 | Tsang et al. |
| 2007/0048617 A1 | 3/2007 | Inda |
| 2007/0154762 A1 * | 7/2007 | Schucker .................. 429/33 |
| 2007/0172739 A1 | 7/2007 | Visco et al. |
| 2007/0221265 A1 * | 9/2007 | Affinito et al. .................. 136/243 |
| 2007/0259235 A1 | 11/2007 | Jacobson et al. |
| 2008/0268327 A1 | 10/2008 | Gordon et al. |
| 2009/0061288 A1 | 3/2009 | Gordon et al. |
| 2009/0134842 A1 | 5/2009 | Joshi et al. |
| 2009/0136830 A1 | 5/2009 | Gordon |
| 2009/0189567 A1 | 7/2009 | Joshi et al. |
| 2010/0068629 A1 | 3/2010 | Gordon |
| 2010/0239893 A1 | 9/2010 | Gordon et al. |
| 2010/0285372 A1 * | 11/2010 | Lee et al. .................. 429/320 |
| 2011/0104526 A1 | 5/2011 | Boxley et al. |
| 2012/0040274 A1 | 2/2012 | Gordon |
| 2012/0126752 A1 | 5/2012 | Joshi et al. |
| 2012/0141856 A1 | 6/2012 | Gordon et al. |

FOREIGN PATENT DOCUMENTS

| | | |
|---|---|---|
| JP | 08321322 A | 12/1996 |
| JP | 2001307709 | 11/2001 |
| JP | 2002-245847 A | 8/2002 |
| KR | 2004047664 | 6/2004 |
| KR | 100651246 | 8/2005 |
| KR | 20070021110 | 2/2007 |
| KR | 2007028588 | 3/2007 |
| WO | WO-2005/038953 | 4/2005 |
| WO | WO-2005/091946 | 10/2005 |

OTHER PUBLICATIONS

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*, 15,(1999),231-237.

Sagane, et al., "Li+ and Na+ transfer through interfaces between inorganic solid electrolytes and polymer or liquid electrolytes", *Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M = Ge, Ti", *Solid State Ionics*, 76,(1995),215-220.

(56) References Cited

OTHER PUBLICATIONS

Kerr, "Polymeric Electrolytes: An Overview", *Lithium Batteries: Science and Technology*, Chapter 19, edited by Nazri and Pistoia, Kluwer Academic Publishers,(2004),574-622.
Young, Lee W., "International Search Report", PCT Search Report for App. No. PCT/US 07/21978, (Oct. 10, 2008),1-2.
Young, Lee W., "Written Opinion of the International Searching Authority", PCT Written Opinion for App. No. PCT/US 07/21978, (Oct. 10, 2008),1-5.
Young, Lee W., "International Search Report", PCT Search Report for App. No. PCT/US 08/10435, (Nov. 25, 2008),1-2.
Young, Lee W., "Written Opinion of the International Searching Authority", PCT Written Opinion for App. No. PCT/US 08/10435, (Nov. 25, 2008),1-4.
Fu, "Effects of M3+ Ions on the Conductivity of Glasses and Glass-ceramics in the system $Li_2O—M_2O_3—GeO_2—P_2O_5$ (M = Al, Ga, Y, Dt, Gd, and La)", *Communications of the American Ceramic Society*, vol. 83, No. 4, (Apr. 2000),104-106.
Thokchom, et al., "Superionic Conductivity in a Lithium Aluminum Germanium Phosphate Glass-Ceramic", *Journal of the Electrochemical Society*, 155 (12), (Oct. 8, 2008),A915-A920.
Fu, "Fast Li+ Ion Conducting Glass Ceramics in the System $Li_2O—Al_2O_3—TiO_2—P_2O_5$", *Science Direct, Solid State Ionics*, vol. 104, Issues 3-4, (Dec. 11, 1997),191-194.
Saienga, et al., "The Comparative Structure, Property, and Ionic Conductivity of LiI + $Li_2S$ + $GeS_2$ Glasses Doped with $Ga_2S_3$ and $La_2S_3$", *Journal of Non-Crystalline Solids*, vol. 354, 14, (Mar. 1, 2008),Abstract.
Wang, et al., "Polymer Composite Electrolytes Containing Active Mesoporous $SiO_2$ Particles", *Journal of Applied Physics*, 102, (2007),1-6.
Wang, et al., "$Li_{1.3}Al_{0.3}Ti_{1.7}(PO_4)_3$ Filler Effect on $(PEO)LiClO_4$ Solid Polymer Electrode", *Department of Materials Science and Engineering, Zhejiang University*, (2004),Abstract.
Goodenough, J.B. et al., "Fast Na+-Ion Transport in Skeleton Structures", *Mat. Res. Bull.*, vol. 11, Pergamon Press, Inc. Printed in the United States,(1976),203-220.
Hong, H.Y-P. et al., "Crystal Structures and Crystal Chemistry in the System $Na_{1+x}Zr_2Si_xP_{3-x}O_{12}$", *Mat. Res. Bull.*, vol. 11, 1976. Pergamon Press, Inc. Printed in the United States.,(1976),173-186.
Bentzen, J. J., et al., "The preparation and characterization of dense, highly conductive $Na_5GdSi_4O_{12}$ nasicon (NGS)", *Materials Research Bulletin*, vol. 15,(1980),1737-1745.
Delmas, C. et al., "Crystal chemistry of the $Na_{1+x}Zr_{2-x}L_x(PO_4)_3$ (L = Cr, In, Yb) solid solutions", *Materials Research Bulletin*, vol. 16,(1981),285-290.
Von Alpen, V. et al., "Compositional dependence of the electrochemical and structural parameters in the NASICON system $(Na_{1+x}Si_xZr_2P_{3-x}O_{12})$", *Solid State Ionics*, vol. 3/4,(1981),215-218.
Fujitsu, S. et al., "Conduction paths in sintered ionic conductive material $Na_{1+x}Y_xZr_{2-x}(PO_4)_3$", *Materials Research Bulletin*, vol. 16,(1981),1299-1309.
Saito, Y. et al., "Ionic Conductivity of NASICON-type conductors $Na_{1.5}M_{0.5}Zr_{1.5}(PO_4)_3$ (M: $Al^{3+}$, $Ga^{3+}$, $Cr^{3+}$, $Sc^{3+}$, $Fe^{3+}$, $In^{3+}$, $Yb^{3+}$, $Y^{3+}$)", *Solid State Ionics*, vol. 58, 1992 ,327-331.
Alamo, J. "Chemistry and properties of solids with the [NZP] skeleton", *Solid State Ionics*, vol. 63-65,(1993),547-561.
Shimazu, K. et al., "Electrical conductivity and $Ti^{4+}$ ion substitution range in NASICON system", *Solid State Ionics*, vol. 79, (1995),106-110.
Miyajima, Y. et al., "Ionic conductivity of NASICON-type $Na_{1+x}M_xZr_{2-x}P_3O_{12}$(M: Yb, Er, Dy)", *Solid State Ionics*, vol. 84,(1996),61-64.
Manickam, Minakshi et al., "Lithium insertion into manganese dioxide electrode in $MnO_2$/Zn aqueous battery Part I. A preliminary study", *Journal of Power Sources*, vol. 130, Issues 1-2 (Obtained through ScienceDirect),(May 2004),254-259.
Kim, "International Search Report", International App. No. PCT/US2008/084707, (Apr. 29, 2009),1-3.
Kim, "Written Opinion of the International Searching Authority", International App. No. PCT/US2008/084707, (Apr. 29, 2009),1-4.
Park, Jin "Written Opinion of the International Searching Authority Mailed on Jun. 30, 2009", Int. App. No. PCT/US2008/084572, 1-3.
Park, Jin "International Search Report Mailed on Jun. 30, 2009", Int. App. No. PCT/US2008/084572, 1-3.
Kim, Jun Hak "Written Opinion of the International Searching Authority Mailed on Aug. 24, 2009", Int. App. No. PCT/US2009/032458, 1-4.
Kim, Jun Hak "International Search Report Mailed on Aug. 24, 2009", Int. App. No. PCT/US2009/032458, 1-3.
Yang, Kyung S., "International Search Report", PCT App. No. PCT/US2011/062534 (Corresponding to U.S. Appl. No. 13/307,123), (Jul. 24, 2012),1-3.
Yang, Kyung S., "Written Opinion of the International Searching Authority", PCT App. No. PCT/US2011/062534 (Corresponding to U.S. Appl. No. 13/307,123), (Jul. 24, 2012),1-3.
Abraham, et al., "A Low Temperature Na—S Battery Incorporating a Soluble S Cathode", *ElectroChimica Acta*, 1978, vol. 23, Pergamon Press Ltd., (Jun. 1, 1978),501-507.
Yun, Cho K., "Internationial Search Report", PCT App. No. PCT/US2012/036959 (corresponding to U.S. Appl. No. 13/466,844), (Nov. 23, 2012),1-3.
Yun, Cho K., "Written Opinion of the International Searching Authority", PCT App. No. PCT/US2012/036959 (corresponding to U.S. Appl. No. 13/466,844), (Nov. 23, 2012),1-5.
Imanaka, Nobuhito "IPDL Machine Translation of JP 2002-245847 A", IPDL Machine Translation of JP 2002-245847 A, (Aug. 30, 2002),1-6.
Park, Jin "International Search Report", PCT App. No. US2008/084728 (Corresponding to U.S. Appl. No. 12/323,165), (Jun. 30, 2009),1-3.
Park, Jin "Written Opinion of the International Searching Authority", PCT App. No. US2008/084728 (Corresponding to U.S. Appl. No. 12/323,165), (Jun. 30, 2009),1-3.
Inda, Yasushi "Bibliography and Abstract (English Language)", Korean patent application publication KR20040047664, (Jun. 5, 2004),1.
Inda, Yasushi "Bibliography and Abstract (English Language)", Korean Patent Application Publication KR20070028588, (Mar. 12, 2007),1.
Apicella, Karie O., "Final Office Action", U.S. Appl. No. 12/323,165, (Sep. 8, 2011),1-11.
Anthony, Julian "Non-Final Office Action", U.S. Appl. No. 12/558,363, (Jan. 5, 2012),1-8.
Cullen, Sean P., "Non-Final Office Action", U.S. Appl. No. 12/725,319, (Jan. 6, 2012),1-10.
Cullen, Sean P., "Final Office Action", U.S. Appl. No. 12/725,319, (Apr. 27, 2012),1-12.
Cho, Jun B., "International Search Report", PCT App. No. US2010/027535 (Corresponding to U.S. Appl. No. 12/725,319), (Oct. 20, 2010),1-4.
Cho, Jun B., "Written Opinion of the International Searching Authority", PCT App. No. US2010/027535 (Corresponding to U.S. Appl. No. 12/725,319), (Oct. 20, 2010),1-5.
Ryu, et al., "Bibliographical Data and Abstract (English Language)", Application Publication for US2007154814, Corresponding to KR10-0651246, (Aug. 22, 2005),1.
Wiedemann, Eric "Supplementary European Search Report", European Patent Application No. 10754004.9 (Corresponding to U.S. Appl. No. 12/725,319, (May 16, 2012),1-6.
Suzuki, et al., "Bibliographical Data and Abstract (English Language)", Japanese Patent application JP62-186470, (Aug. 14, 1987),1-2.
Jang, Sung W., "International Search Report", PCT/US2011/046143 (Corresponding to U.S. Appl. No. 13/195,431), (Feb. 27, 2012),1-3.
Jang, Sung W., "Written Opinion of the International Searching Authority", PCT/US2011/046143 (Corresponding to U.S. Appl. No. 13/195,431), (Feb. 27, 2012),1-3.
Kabe, T. et al., "Hydrodesulfurization and Hydrodenitrogenation", *Wiley-VCH* (1999), 37, 110-112.
Task Force on Strat. Uncnv. Fuel, "America's Strategic Unconventional Fuels, vol. III Resource and Technology Profiles", *America's*

(56) References Cited

OTHER PUBLICATIONS

*Strategic Unconventional Fuels*, vol. III Resource and Technology Profiles (completed Feb. 2007, Published Sep. 2007)., Full text available at http://www.unconventionalfuels.org/publications/reports/Volume_III_ResourceTechProfiles(Final).pdf,(Sep. 2007),III-25.

Lee, Kang Young "International Search Report", International App. No. PCT/US2010/055718, (Jun. 21, 2011),1-3.

Lee, Kang Young "Written Opinion", International App. No. PCT/US2010/055718, (Jun. 21, 2011),1-3.

Apicella, Karie O., "Office Action for U.S. Appl. No. 12/323,165", (Jun. 1, 2011),1-10.

Armand, Michel et al., "ionic-liquid materials for the electrochemical challenges of the future", *Nature Materials*, (Jul. 24, 2009),621-629.

Cantelmo, Gregg "Office Action for U.S. Appl. No. 11/944,719", (Dec. 27, 2010),1-8.

Doyle, Kevin P., et al., "Dentrite-Free Electrochemical Deposition of Li—Na Alloys from an Ionic Liquid Electrolyte", *Journal of The Electrochemical Society*, (May 2006),A1353-A1357.

IPDL Machine Translation of JP08-321322A, 1-10, Dec. 3, 1996.

Kalafut, Stephen J., "Office Action for U.S. Appl. No. 11/871,824", (Dec. 10, 2010),1-7.

Kalafut, Stephen J., "Office Action for U.S. Appl. No. 11/871,824", (May 25, 2010),1-8.

Kim, K et al., "Electrochemical Investigation of Quaternary Ammonium/Aluminum Chloride Ionic Liquids", *Journal of the Electrochemical Society*, (Jun. 2004),A1168-A1172.

Kim, Ketack et al., "The Role of Additives in the Electroreduction of Sodium Ions in Chloroaluminate-Based Ionic Liquids", *Journal of The Electrochemical Society*, (Dec. 2004),E9-E13.

Kim, Yeon-Gyeong "PCT International Search Report", Int. App. No. PCT/US2009/056781, (Mar. 2, 2010),1-4.

Kim, Yeon-Gyeong "PCT Written Opinion", Int. App. No. PCT/US2009/056781, (Mar. 2, 2010),1-3.

Lang, Christopher M., et al., "Cation Electrochemical Stability in Chloroaluminate Ionic Liquids", *J. Phys. Chem.*, (2005),19454-19462.

Parsons, Thomas H., "Office Action for U.S. Appl. No. 12/022,381", (May 24, 2011),1-11.

Salminen, Justin et al., "Ionic liquids for rechargeable lithium batteries", *Lawrence Berkeley National Laboratory*, (Sep. 21),1-19, Sep. 2008.

Wu, Xian Ming et al., "Preparation and characterization of lithium-ion-conductive Li(1.3)Al(0.3)Tl(1.7)(PO4)3 thin films by the solution deposition", *Thin Solid Films 425*, (2003),103-107.

Yoshimura, et al., "IPDL Machine Translation of JP-2001-307709", IPDL Machine Translation of JP-2001-307709, (Nov. 2, 2001),1-12.

Sonoda, et al., "Bibliographical Data and Abstract (English Translation)", Japanese Patent Application JP-59-75985, (Apr. 28, 1984),1-2.

\* cited by examiner

LITHIUM—SULFUR BATTERY WITH A SUBSTANTIALLY NON-POROUS LISICON MEMBRANE AND POROUS LISICON LAYER

RELATED APPLICATIONS

This application claims priority to U.S. Provisional Patent No. 60/970,178 filed on Sep. 5, 2007 and entitled HIGH RATE LITHIUM-SULFUR BATTERY WITH NON-POROUS CERAMIC SEPARATOR.

BACKGROUND OF THE INVENTION

1. Field of the Invention

This invention relates to batteries and more particularly to apparatus and methods for improving the performance of lithium-sulfur batteries.

2. Description of the Related Art

Our society has come to rely on batteries to power a myriad of devices, including computers, cell phones, portable music players, lighting devices, as well as many other electronic components. Nevertheless, there is an ongoing need for further advances in battery technology. For example, there is still a significant need for economical batteries that can power automobiles or provide load-leveling capabilities for wind, solar, or other energy technologies. Furthermore, the "information age" increasingly demands portable energy sources that provide lighter weight, higher energy, longer discharge times, more "cycles", and smaller customized designs. To achieve these advances, technologists continue to work to develop batteries with higher and higher energy densities while still providing acceptable safety, power densities, cost, and other needed characteristics.

Lithium-sulfur (Li—S) batteries offer great potential to meet many of the above-stated needs. The theoretical specific energy of lithium-sulfur batteries is 2600 Wh/kg, which is one of the highest known energy densities for batteries that use non-gaseous constituents. The materials needed to produce these batteries are light, energetic, inexpensive, and readily available. In contrast with most cathode materials, sulfur is relatively non-toxic, making these batteries relatively safe for human contact.

Nevertheless, rechargeable lithium-sulfur batteries have failed to achieve commercial success for several reasons. These reasons include: (1) rapid capacity fade on cycling; (2) high self-discharge; and (3) poor utilization of the cathode. The first two reasons, namely capacity fade on cycling and high self-discharge, are related. These problems primarily occur because some of the cathode constituents, namely lithium polysulfides, are soluble in typical electrolytes. When a porous or microporous separator is used, these cathode constituents tend to migrate to the anode with each cycle, resulting in irreversible capacity loss. Although some researchers have used polymer backbones or binders in the cathode to immobilize polysulfides and thereby improve cycle stability, the stability is undesirably accompanied by poor cathode utilization and hence disappointing specific energy.

One prior art attempt to resolve some of the above-stated problems is disclosed in U.S. Pat. No. 6,852,450 issued to Hwang et al. (hereinafter "Hwang"), which is herein incorporated by reference. In this reference, Hwang attempts to improve cathode utilization by recognizing the differences in dissolution characteristics between elemental sulfur, and lithium sulfide or lithium polysulfide. Hwang teaches that sulfur is apolar and dissolves best in an apolar solvent such as benzene, fluorobenzene, toluene, trifluortoluene, xylene, cyclohexane, tetrahydrofurane, or 2-methyl tetrahydrofurane. Lithium sulfide and polysulfides are polar and thus are best dissolved in polar solvents such as a carbonate organic solvent or tetraglyme. In addition, an effective electronic conductor, such as SUPER P Li™ Conductive Carbon Black (hereinafter "Super P carbon"), may be added to the cathode constituents to improve electrical conductivity.

In one example, Hwang used the solvents tetrahydrofurane/propylene carbonate/dimethyl carbonate in a 20/40/40 ratio in the cathode. The third solvent was intentionally selected to be a relatively viscous solvent to reduce the impact of constituent migration through the micro-porous membrane in the Hwang battery. The cathode initially consisted of sixty percent elemental sulfur with twenty percent Super P carbon, and twenty percent polyvinyl acetate (PVA). The latter constituent was apparently added to reduce the mobility of the soluble species and to serve as a binder. By using an apolar and polar solvent mixture to partially dissolve both elemental sulfur and lithium sulfides and polysulfides, Hwang was able to achieve impressive specific capacities when cycling between 1.5V and 2.8V at various C-rates. Hwang was initially able to demonstrate about 1000 Wh/kg specific energy while cycling at a 1C rate. However, capacity was lost with each subsequent cycle.

In view of the foregoing, what is needed is a lithium-sulfur battery that equals or improves upon the cathode utilization achieved by Hwang, while also reducing the capacity fade and self-discharge exhibited by the Hwang battery.

SUMMARY OF THE INVENTION

The invention has been developed in response to the present state of the art and, in particular, in response to the problems and needs in the art that have not yet been fully solved by currently available lithium-sulfur batteries. Accordingly, the invention has been developed to provide systems and methods to improve the performance of lithium-sulfur batteries. The features and advantages of the invention will become more fully apparent from the following description and appended claims, or may be learned by practice of the invention as set forth hereinafter.

Consistent with the foregoing and in accordance with the invention as embodied and broadly described herein, a lithium-sulfur battery is disclosed in one embodiment of the invention as including an anode containing lithium and a cathode comprising elemental sulfur. The cathode may include at least one solvent selected to at least partially dissolve the elemental sulfur and $Li_2S_x$. A substantially non-porous lithium-ion-conductive membrane is provided between the anode and the cathode to keep sulfur or other reactive species from migrating between the anode and cathode.

In certain embodiments, the lithium-sulfur battery includes a separator between the anode and the non-porous lithium-ion-conductive membrane. This may prevent the lithium in the anode from reacting with the non-porous lithium-ion-conductive membrane. In certain embodiments, the separator is a porous separator infiltrated with a lithium-ion-conductive electrolyte.

In selected embodiments, the non-porous lithium-ion-conductive membrane is a thin LISICON ceramic membrane. In certain embodiments, the LISICON membrane is a slightly porous structure treated with a sealer to fill any pores in the structure, thereby making the membrane substantially non-porous. In certain embodiments, a porous structural layer, such as one or more porous LISICON layers, are attached to one or more sides of the substantially non-porous lithium-ion-conductive membrane to provide support thereto.

In another embodiment, a method in accordance with the invention may include generating lithium ions at a lithium-containing anode. These lithium ions may then be transported through a substantially non-porous lithium-ion-conductive membrane to a cathode. At the cathode, the lithium ions may be reacted with elemental sulfur, which is at least partially dissolved in one or more solvents. This reaction may generate $Li_2S_x$, which may also at least partially dissolve in the one or more solvents. In selected embodiments, the method may further include separating the lithium-containing anode from the substantially non-porous lithium-ion-conductive membrane to keep the lithium-containing anode from reacting with the membrane. This may be accomplished, for example, by placing a porous separator, infiltrated with a lithium-ion-conductive electrolyte, between the lithium-containing anode and the lithium-ion-conductive membrane.

The present invention provides an improved lithium-sulfur battery that overcomes various limitations of conventional lithium-sulfur batteries. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
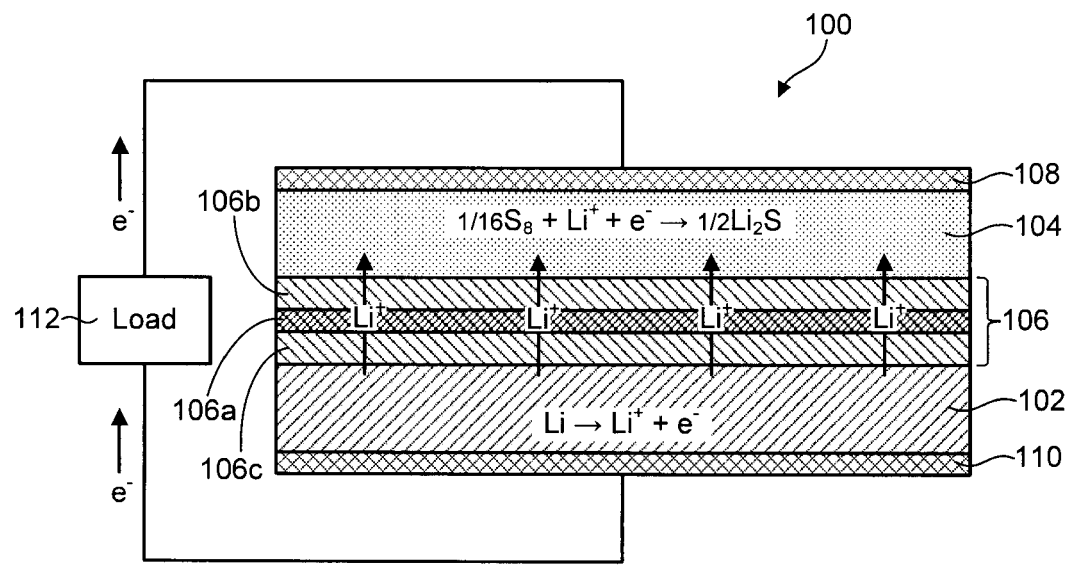
FIG. 1 is a high-level block diagram showing one embodiment of a lithium-sulfur battery under load.

Referring to FIG. 1, one embodiment of a lithium-sulfur battery 100 under load is illustrated. In general, a lithium-sulfur battery 100 in accordance with the invention that overcomes various problems of the prior art may include a lithium-containing anode 102, a sulfur-containing cathode 104, and a substantially non-porous lithium-ion-conductive membrane 106a. In this embodiment, the substantially non-porous lithium-ion conductive membrane 106a is a thin, dense, substantially non-porous lithium-ion-conductive membrane 106a sandwiched between or adjacent to one or more thicker, less-dense, porous layers 106b, 106c, collectively forming the supported membrane 106. The porous layer(s) 106b, 106c may provide mechanical support to the substantially non-porous lithium-ion-conductive membrane 106a in addition to allowing liquid electrolytes (e.g., the cathode and/or anode electrolytes) to permeate the pores thereof. Current collectors 108, 110, such as metal screens or meshes, may be placed in contact with or be embedded within the anode 102 and cathode 104, respectively, to conduct electrical current to and from the anode 102 and cathode 104.

In certain embodiments, the lithium-containing anode 102 may include lithium metal, a carbon matrix containing lithium metal, or other lithium-containing materials or composites. In certain embodiments, the unique design of the cell 100 may enable use of a metallic lithium anode (which has never been commercialized in a rechargeable battery due to safety reasons). The safety of the metallic lithium anode 102 may be addressed in the following ways. First, the substantially non-porous membrane 106 may prevent dendritic shorts (shorts occurring when thin needle-like lithium crystals form upon recharge and penetrate a microporous separator). Second, an unreducible salt such as lithium chloride or lithium iodide may be used as an electrolyte in the anode 102 to reduce the possibility that the anode 102 will react therewith.

The cathode 104 may include elemental sulfur (typically $S_8$ molecules in solid form) and $Li_2S_x$ (lithium monosulfide and/or polysulfide), and one or more solvents selected to at least partially dissolve the elemental sulfur and the $Li_2S_x$. The solvents may increase the mobility of the elemental sulfur and $Li_2S_x$ to help them to participate more fully in the reaction occurring at the cathode. This improvement in mobility may significantly improve cathode utilization. In certain embodiments, an electronic conductor such as Super P carbon may be added to the solvents to improve the electrical conductivity of the solvent mixture.

In certain embodiments, one or more solvents may be selected to at least partially dissolve elemental sulfur and/or $Li_2S_x$. The solvents will also ideally have a relatively high boiling point. Because $Li_2S_x$ is polar, in certain embodiments, a polar solvent may be selected to at least partially dissolve the $Li_2S_x$. Similarly, because elemental sulfur is apolar, an apolar solvent may be selected to at least partially dissolve the elemental sulfur. Nevertheless, in general, the solvents may include any single solvent or mixture of solvents that are effective to at least partially dissolve elemental sulfur and/or $Li_2S_x$.

For example, the instant inventors have discovered that tetraglyme (TG), a polar solvent which is useful for dissolving $Li_2S_x$, also significantly partially dissolves sulfur. Thus, tetraglyme by itself, or in combination with other polar solvents, may be used exclusively as the solvent or solvents in the cathode 104. This characteristic of tetraglyme (and possibly other polar solvents) is not believed to be disclosed in the prior art. The solubility characteristics of tetraglyme are especially beneficial when used with a substantially non-porous lithium-ion-conductive membrane 106a. Other solvents that may be used in the cathode 104 may include tetrahydrafuran (THF) and/or dimethylanaline (DMA), the solubility characteristics of which are shown below in Tables 1 and 2. DMA is apolar and has been found to be particularly effective at dissolving elemental sulfur, while also having a relatively high boiling point.

TABLE 1

Sulfur Solubility in Various Solvents in Molar Percentage
Sulfur Solubility, Molar Percentage

| Solvent Mix | 25° C. | 50° C. | 70° C. |
|---|---|---|---|
| 80 TG:20 THF | 0.095 | 0.4278 | |
| 100 TG | 0.050 | 0.322 | 0.350 |
| 100 THF | 0.427 | 0.467 | |
| 100 DMA | 1.043 | 2.227 | 3.586 |
| 80 TG:20 DMA | 0.144 | 0.397 | |

TABLE 2

Sulfur Solubility in Various Solvents in Weight Percentage
Sulfur Solubility, Weight Percentage

| Solvent Mix | 25° C. | 50° C. | 70° C. |
|---|---|---|---|
| 80 TG:20 THF | 0.310 | 1.375 | |
| 100 TG | 0.159 | 1.010 | 1.097 |
| 100 THF | 1.516 | 1.658 | |
| 100 DMA | 3.366 | 6.924 | 10.692 |
| 80 TG:20 DMA | 0.459 | 1.257 | |

As described above, the battery 100 may include a substantially non-porous lithium-ion conductive membrane 106a. Unlike conventional lithium-sulfur batteries, which may use a porous membrane, the substantially non-porous lithium-ion-conductive membrane 106a may prevent cathode constituents from migrating through the substantially non-porous lithium-ion-conductive membrane 106a to the anode 102 where they may cause irreversible capacity loss. The substantially non-porous lithium-ion-conductive membrane 106a may also allow the cathode solvent mixture to be optimized to best dissolve the cathode constituents and the cathode constituents to be optimized for better rate capability and/or specific capacity. For example, by using a substantially non-porous lithium-ion-conductive membrane 106a, a viscous solvent or binder such as polyvinyl acetate (PVA) may become unnecessary in the cathode 104. Furthermore, by using a substantially non-porous lithium-ion-conductive membrane 106a, a solvent and electrolyte salt that is better suited for anode cycling performance may be used in the anode 102. In the event the substantially non-porous lithium-ion-conductive membrane 106a has some porosity, the pores may be filled with a sealer (e.g., a polymer) and wiped clean to prevent the migration of cathode constituents to the anode 102.

Figure 7:
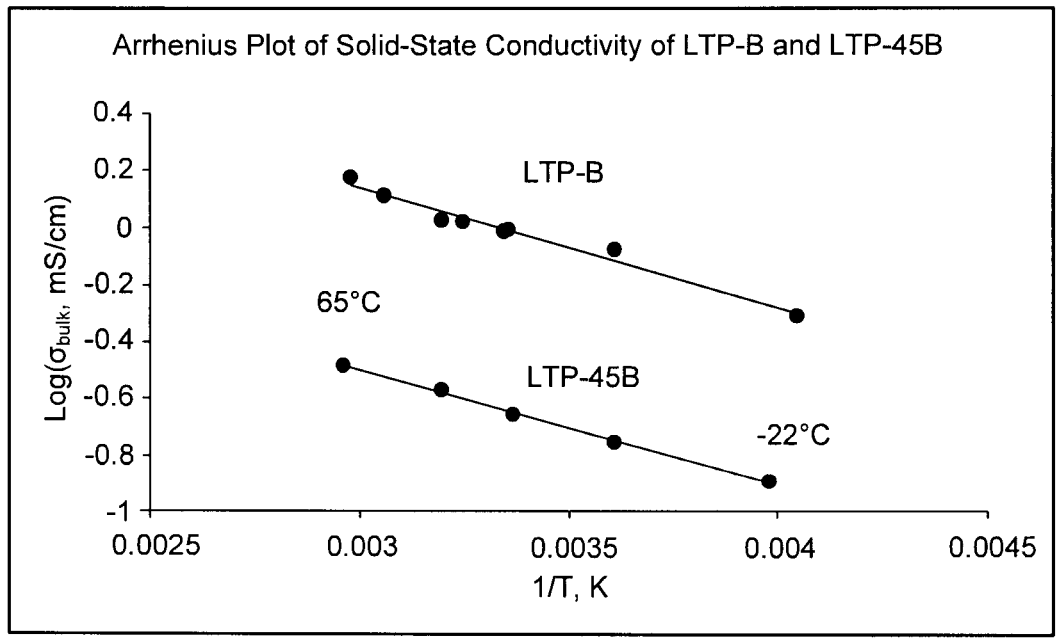
FIG. 7 is a plot showing the solid-state conductivity of two formulations of LISICON ceramic that may be used in a lithium-sulfur battery in accordance with the invention.

In selected embodiments, the substantially non-porous lithium-ion-conductive membrane 106a is a lithium super ionic conductor (LISICON) produced by Ceramatec, Inc. of Salt Lake City, Utah. Although not limited to this formulation, the general composition of the LISICON may be $Li_{1+x}$ $Al_xTi_{2-x}(PO_4)_3$, where x is between 0.0 and 0.5. Various dopants may be added to the LISICON to improve strength, conductivity, and/or sintering. The LISICON materials produced by Ceramatec exhibit good ionic conductivities at temperatures as low as to −20° C. These conductivity values are higher than solid polymer electrolytes. Furthermore, the substantially non-porous lithium-ion-conductive membrane 106a comprised of LISICON or other suitable materials may be fabricated as thin as tens of microns thick with supporting porous layers 106b, 106c to provide strength and a mechanical barrier to lithium dendrites (thin metallic crystals forming on the anode 102), thereby forming the supported membrane 106. Porous layers 106b, and 106c may be ribbed to provide further support to the substantially non-porous lithium-ion-conductive membrane 106a. The ionic conductivities of two different LISICON formulations (45B and LTP-B) produced by Ceramatec are shown below in Table 3. An Arrhenius plot of the solid-state conductivity of the two formulations (LTP-B and LTP-45B) is illustrated in FIG. 7.

TABLE 3

LISICON Conductivities at Various Temperatures
LISICON Conductivity (mS/cm)

| Temp C. | 45B | LTP-B | Ratio |
|---|---|---|---|
| −20 | 0.130 | 0.551 | 4.25 |
| 25 | 0.226 | 0.975 | 4.31 |
| 60 | 0.315 | 1.367 | 4.34 |

Although LISICON membranes represent one candidate material that is substantially non-porous and conductive to lithium ions, the substantially non-porous lithium-ion-conductive membrane 106a is not limited to this material. Indeed, any substantially non-porous lithium-ion-conductive material may be used for the substantially non-porous lithium-ion-conductive membrane 106a. Currently, various non-porous ceramic glasses have been reported to have conductivities on the order of $10^{-2}$ S/cm and thus may also be candidate materials for the substantially non-porous lithium-ion-conductive membrane 106a.

Upon discharging the battery 100, lithium metal may be oxidized at the anode 102 to produce lithium ions and electrons in accordance with the following equation:

$$Li \rightarrow Li^+ + e^-$$

The electrons may be conducted through a load 112 and the lithium ions may be conducted through the substantially non-porous lithium-ion-conductive membrane 106a to the cathode 104. At the cathode 104, the lithium ions may react with sulfur to form a high polysulfide (e.g., $Li_2S_x$ where x=6 or 8). These high polysulfides may then be reduced to form lower polysulfides (e.g., $Li_2S_y$ where y=x−2). The lower polysulfides may then be reduced further to form lithium monosulfide ($Li_2S$). In general, the reactions at the cathode 104 may be described by the following equations:

Initial reaction: $Li^+ + x/16 S_8 + e^- \rightarrow \frac{1}{2} Li_2S_x$, where x=4, 6, or 8

Intermediate Reaction: $Li^+ + \frac{1}{2} Li_2S_x + e^- \rightarrow \frac{1}{2} Li_2S_y$, where x=4, 6, or 8 and y=x−2

Final Reaction: $Li^+ + \frac{1}{2} Li_2S_2 + e^- \rightarrow Li_2S$

Overall, as illustrated in FIG. 1, the reaction occurring at the cathode 104 may be generalized as follows:

Overall Reaction: $\frac{1}{16} S_8 + Li^+ + e^- \rightarrow \frac{1}{2} Li_2S$

Initially, as sulfur is reduced to polysulfide at the cathode 104, the cell voltage may start at about 2.5V. This voltage may drop to about 2.1 V as high polysulfides are reduced to lower polysulfides. This behavior may be observed by the battery discharge characteristic illustrated in FIG. 8. As lithium monosulfide is precipitated, the cell may tend to polarize and decrease the voltage significantly. Failure to reduce $Li_2S_2$ to $Li_2S$ may result in a systematic capacity loss of up to forty-one percent. Thus, it is important to select a cathode solvent that will dissolve this reaction product to some extent. By properly selecting the solvent(s), the polarization observed during formation of lithium monosulfide may be reduced or substantially avoided.

Figure 2:
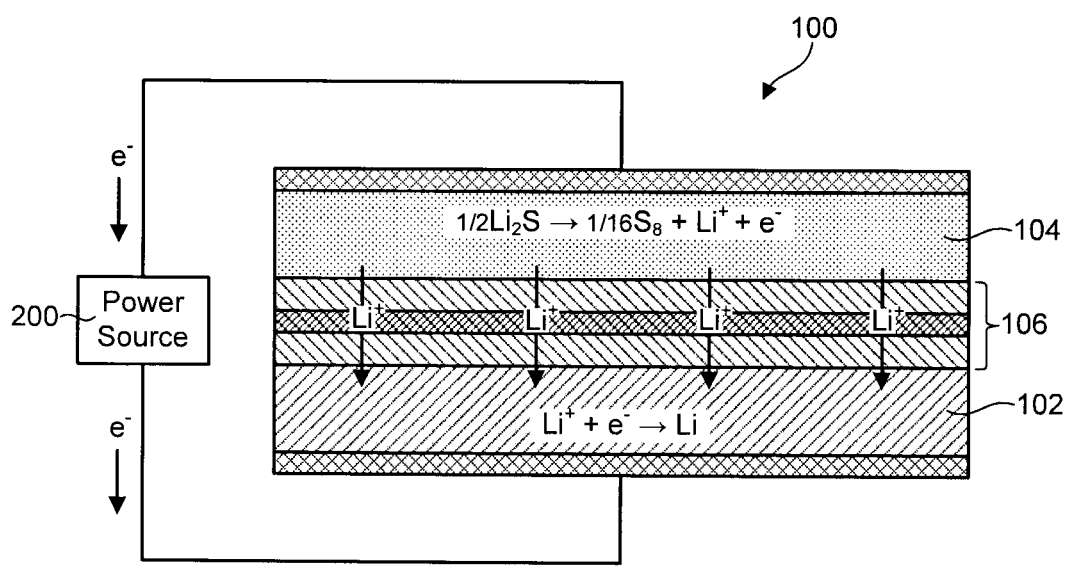
FIG. 2 is a high-level block diagram showing one embodiment of a lithium-sulfur battery during recharge.

Referring to FIG. 2, upon charging, the $Li_2S$ may be broken down at the cathode 104 to produce elemental sulfur, lithium ions, and electrons in accordance with the following equation:

$$\tfrac{1}{2}Li_2S \rightarrow \tfrac{1}{16}S_8 + Li^+ + e^-$$

The electrons may be conducted through a power source 200 and the lithium ions may be conducted through the substantially non-porous lithium-ion-conductive membrane 106a to the anode 102. At the anode 102, the lithium ions may react with electrons to generate lithium metal in accordance with the following equation:

$$Li^+ + e^- \rightarrow Li$$

Due to the improved mobility of elemental sulfur and $Li_2S_x$ at the cathode 104, and the ability to prevent or reduce cathode constituents from migrating to the anode 102, the battery 100 may exhibit (1) reduced capacity fade on cycling; (2) reduced self-discharge; and (3) improved cathode utilization. This represents a significant improvement over conventional lithium-sulfur batteries.

Figure 3:
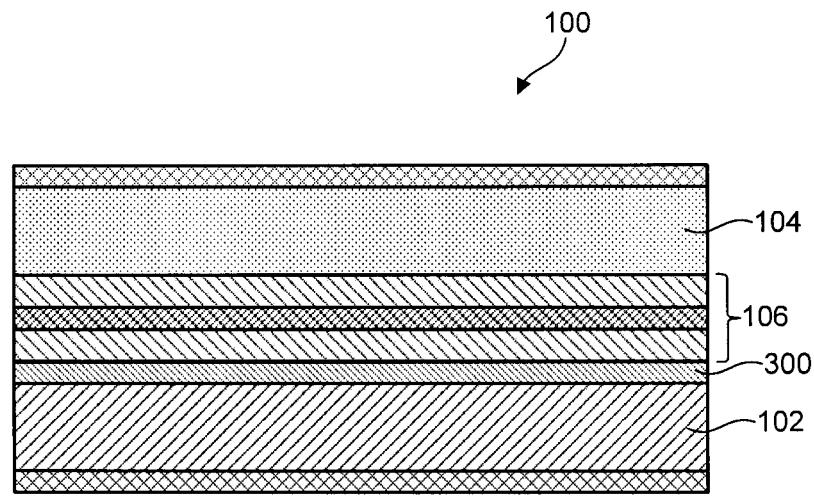
FIG. 3 is a high-level block diagram showing one embodiment of a lithium-sulfur battery having a separator between the non-porous membrane and the lithium-containing anode.

Referring to FIG. 3, in selected embodiments, a lithium-sulfur battery 100 in accordance with the invention may include a separator 300 between the anode 102 and the substantially non-porous lithium-ion-conductive membrane 106a to keep the lithium in the anode 102 from reacting with constituents in the substantially non-porous lithium-ion-conductive membrane 106a. For example, LISICON and other materials may not be completely stable when in contact with the lithium-containing anode 102. In particular, the lithium in the anode 102 may tend to react with certain constituents in formulations of LISICON, particularly titanium. Thus, apparatus and methods are needed to prevent any LISICON in the substantially non-porous lithium-ion-conductive membrane 106a from reacting with the lithium in the anode 102.

In selected embodiments in accordance with the invention, a separator 300, such as a micro-porous separator 300 (e.g., CellGuard 2400 or 2600 or other micro-porous separator 300), may be placed between the substantially non-porous lithium-ion-conductive membrane 106a and the lithium-containing anode 102. The micro-porous separator 300 may be infused (e.g., dipped, sprayed, etc.) with a solvent, such as tetraglyme, and an inorganic lithium salt such as lithium hexafluorophosphate ($LiPF_6$) to provide a path to conduct lithium ions between the anode 102 and the substantially non-porous lithium-ion-conductive membrane 106a. In general, the separator 300 may provide spatial separation between the anode 102 and the substantially non-porous lithium-ion-conductive membrane 106a while still conducting lithium ions therebetween.

Figure 4:
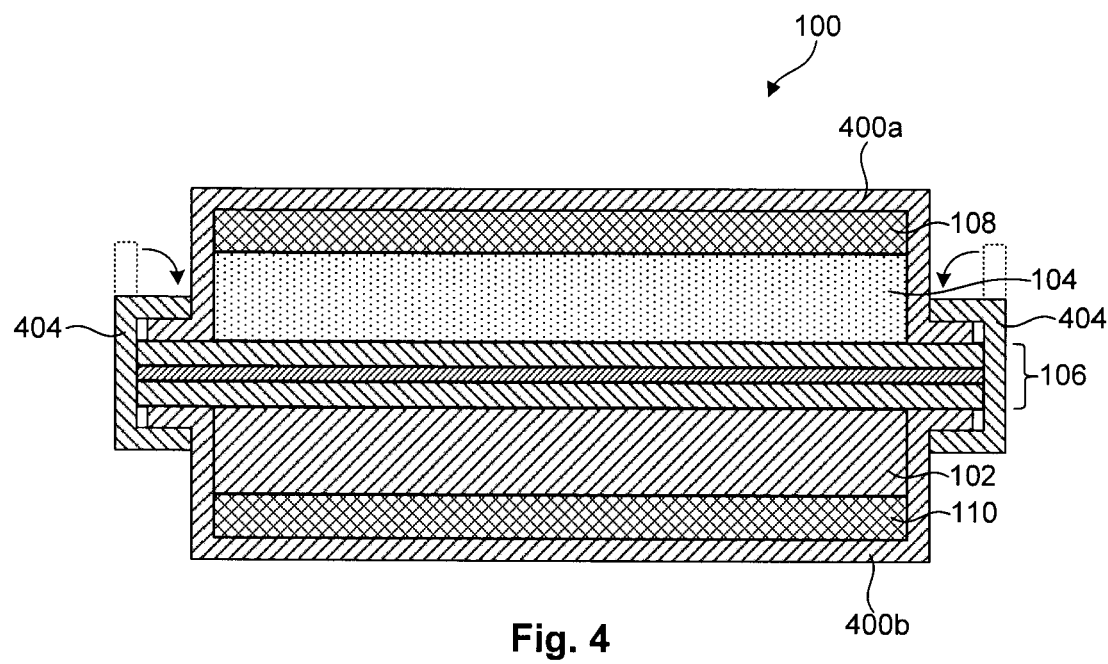
FIG. 4 is a high-level block diagram showing one method for making a lithium-sulfur battery in accordance with the invention.

Referring to FIG. 4, in certain embodiments, a physical implementation of a lithium-sulfur battery 100 in accordance with the invention may include a housing 400a, 400b divided into two halves 400a, 400b. One half 400b may contain the lithium-containing anode 102 and a current collector 110 (e.g., a copper screen) connected to or embedded within the anode 102. The other half 400a may contain the cathode 104 comprised of constituents, namely elemental sulfur and the reaction product $Li_2S_x$ at least partially dissolved in a solvent. A current collector 108 (e.g., an aluminum screen) may be electrically coupled to the cathode 104. In certain embodiments, the halves 400a, 400b may be electrically conductive, thereby acting as electrodes for the battery 100. In other embodiments, the halves 400a, 400b are electrically insulating. In such embodiments, wires or other conductors may be connected to the current collectors 108, 110 to carry electrical current through the housing 400a, 400b.

In certain embodiments, the substantially non-porous lithium-ion-conductive membrane 106a may be sandwiched between the two halves 400a, 400b to seal and isolate the cathode 104 from the anode 102. In certain embodiments, a plastic or elastomeric grommet or other suitable material may be used to seal the two halves 400a, 400b to the membrane 106. In certain embodiments, a clamping device 404, such as a clip, band, crimp, or the like, may be used to clamp the halves 400a, 400b to the substantially non-porous lithium-ion-conductive membrane 106a and hold the halves 400a, 400b in place. Because all the constituents required for the battery 100 to operate may be contained within the housing 400a, 400b, the battery 100 may, in certain embodiments, be a sealed system.

Figure 5:
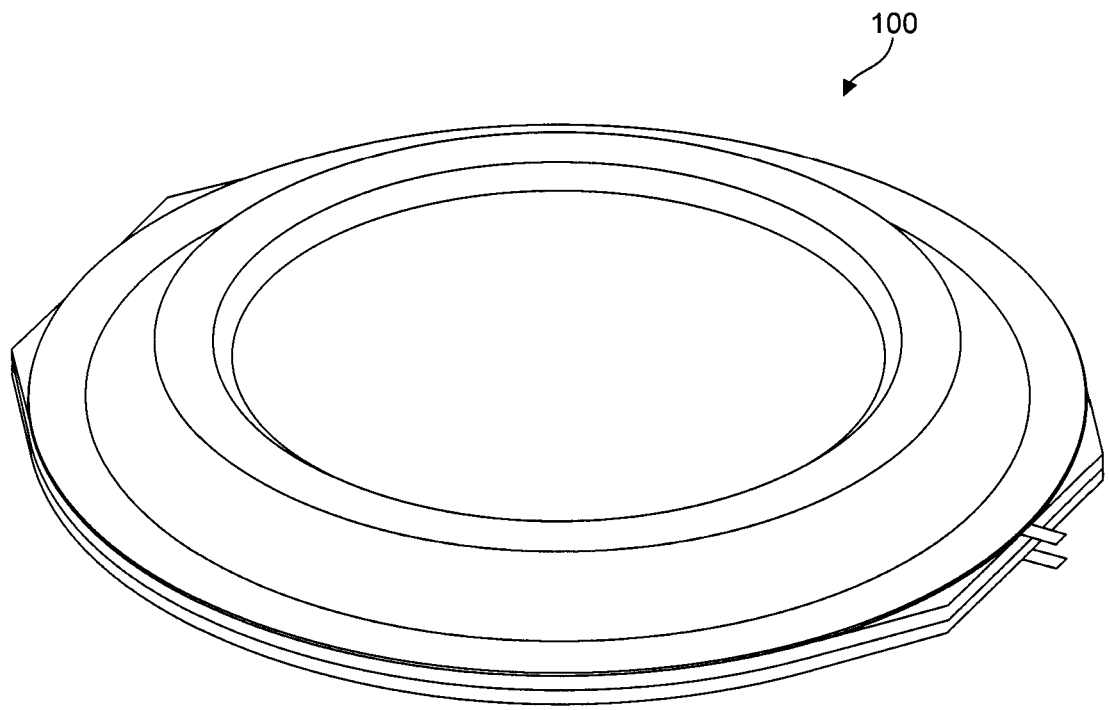
FIG. 5 is a more detailed diagram of one method for making a lithium-sulfur battery in accordance with the invention.
Figure 6:
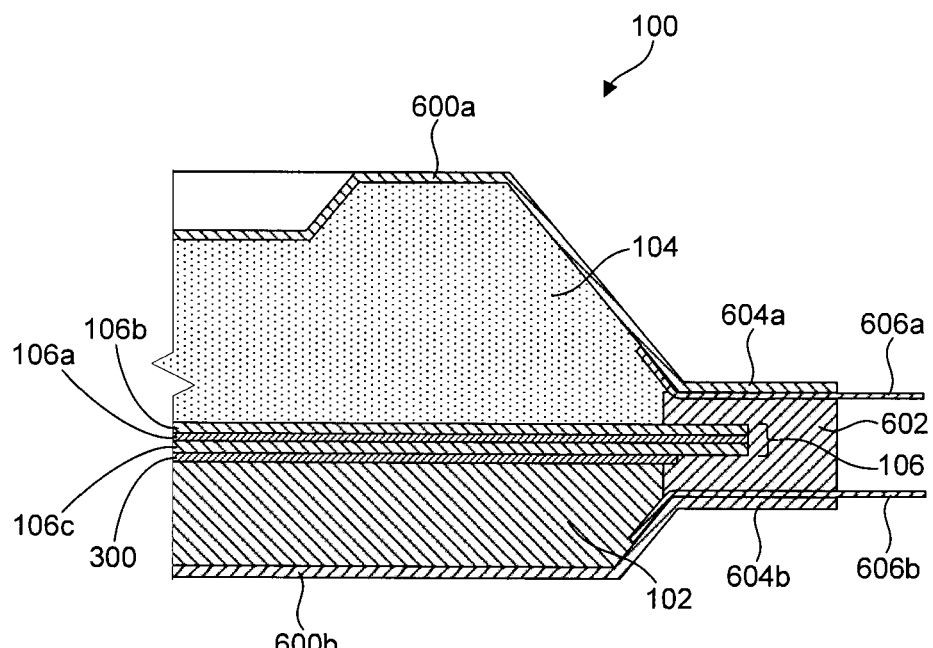
FIG. 6 is a partial, cross-sectional side view of the lithium-sulfur battery of FIG. 5.

Referring to FIGS. 5 and 6, in another embodiment, a lithium-sulfur battery 100 may include a flexible, electrically-insulating outer shell or housing 600a, 600b such as a polyethylene housing 600a, 600b. Such a flexible housing 600a, 600b may tolerate volume changes encountered over a broad temperature range. Like the previous example, the housing 600a, 600b may, in selected embodiments, be divided into two halves 600a, 600b, with one half 600a housing the cathode 104 and the other half 600b housing the anode 102. The supported membrane 106, which in this example includes a substantially non-porous lithium-ion-conductive membrane 106a sandwiched between two porous layers 106b, 106c used for structural support, may separate the cathode 104 and the anode 102. In certain embodiments, a lithium-ion-conductive separator 300 may be used to spatially separate the anode 102 from the substantially non-porous lithium-ion-conductive membrane 106a.

In selected embodiments, an electrically insulating support ring 602, or clamp 602, such as a polyethylene or ceramic ring, may be bonded and sealed to an outer circumference of the supported membrane 106. This support ring 602 may then be clamped, bonded, and sealed to flanges 604a, 604b of the housing 600a, 600b to provide an effective seal with the supported membrane 106 and seal the compartments containing the cathode 104 and anode 102. In certain embodiments, electrically conductive tabs 606a, 606b may be electrically connected to current collectors (not shown) which may be connected to or embedded within the anode 102 and cathode 104 respectively.

Figure 8:
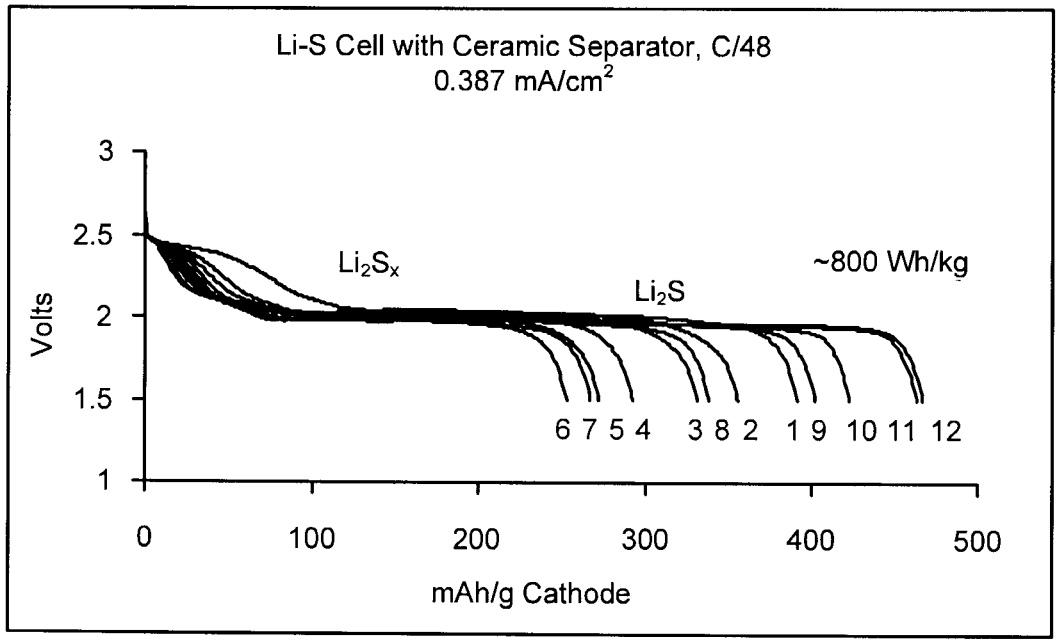
FIG. 8 is a plot showing the discharge characteristics of one experimental lithium-sulfur cell with a substantially non-porous lithium-ion-conductive membrane.

Referring to FIG. 8, a plot showing the discharge characteristics of a lithium-sulfur cell 100 using tetraglyme as the cathode solvent is illustrated. In this example, the plot shows discharge characteristics for twelve cycles at a discharge current of C/48 and a current density of 0.387 mA/cm². In this example, the cathode 104 was composed of a 60:20:20 heterogeneous blend of solid constituents, using sixty percent sulfur by weight, twenty percent conductive carbon, and twenty percent plastic binder. As can be seen from the plot, the capacity of the lithium-sulfur cell 100 decreased for the first six cycles but then began to increase the next six cycles.

It is believed that the increased capacity may be due to a redistribution of sulfur in the cathode 104 after a few cycles. The cell 100 further exhibited reduced capacity fade on cycling, reduced self-discharge, and improved cathode utilization.

Figure 9:
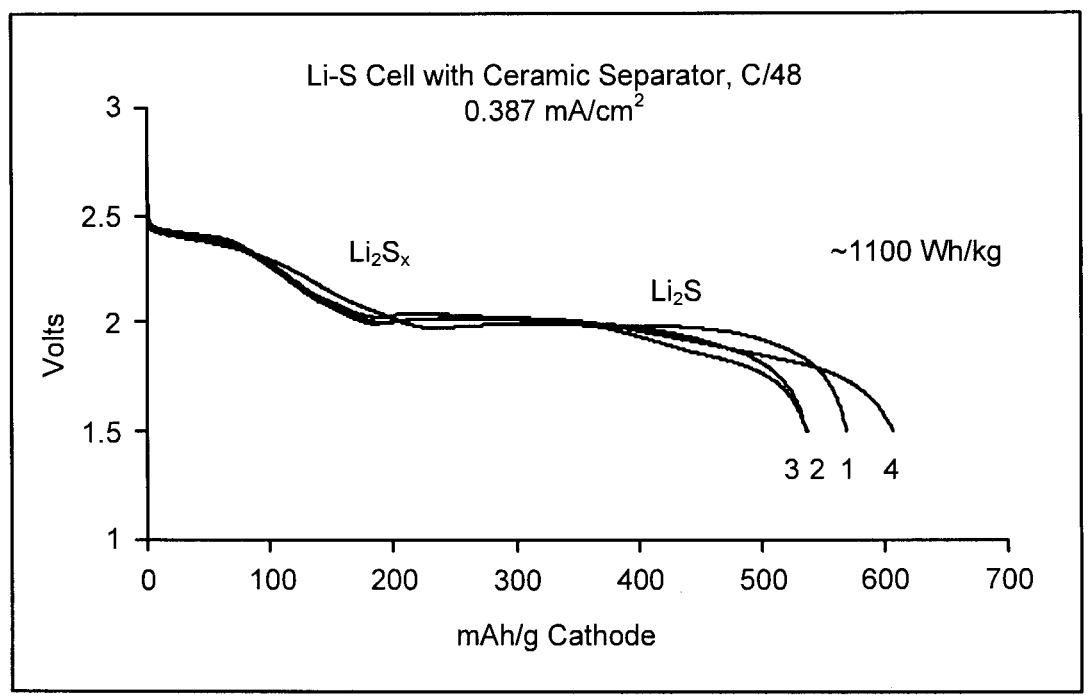
FIG. 9 is a plot showing the discharge characteristics of another experimental lithium-sulfur cell with a substantially non-porous lithium-ion-conductive membrane.

Referring to FIG. 9, another plot showing the discharge characteristics of a different lithium-sulfur cell 100 using tetraglyme as the cathode solvent is illustrated. This plot shows discharge characteristics for four cycles at a discharge current of C/48 and a current density of 0.387 mA/cm². In this example, the cell 100 was similar to the cell 100 of FIG. 8 except that the cathode 104 was composed of a 60:20:20 substantially homogeneous blend of solid constituents (as opposed to the more heterogeneous blend of solid constituents associated with FIG. 8). As can be seen from the plot, the performance of the lithium-sulfur cell 100 improved significantly compared to that of FIG. 8. The cell 100 is still running at the time of filing this application and is expected to have long cycle life with excellent specific energy.

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A lithium-sulfur battery comprising:
an anode containing lithium;
a cathode consisting of elemental sulfur, $Li_2S_x$ and at least one solvent selected to at least partially dissolve the elemental sulfur and $Li_2S_x$;
a substantially non-porous lithium-ion-conductive membrane separating the anode from the cathode, wherein the substantially non-porous lithium-ion-conductive membrane comprises a LISICON membrane; and
a porous structural layer attached to at least one side of the substantially non-porous lithium-ion-conductive membrane to provide support thereto, wherein the porous structural layer is a porous LISICON layer, wherein the porous structural layer directly contacts a portion of the anode.

2. The lithium-sulfur battery of claim 1, wherein the at least one solvent consists of at least one polar solvent to at least partially dissolve the elemental sulfur and the $Li_2S_x$.

3. The lithium-sulfur battery of claim 1, wherein the at least one solvent consists of an apolar solvent to dissolve the elemental sulfur and a polar solvent to dissolve the $Li_2S_x$.

4. The lithium-sulfur battery of claim 1, wherein the at least one solvent consists of tetraglyme.

5. A lithium-sulfur battery comprising:
an anode containing lithium;
a cathode consisting of elemental sulfur, $Li_2S_x$ and at least one solvent selected to at least partially dissolve the elemental sulfur and $Li_2S_x$;
a substantially non-porous LISICON membrane separating the anode from the cathode, wherein the LISICON membrane is treated with a sealer to fill any pores thereof; and
a porous structural layer attached to at least one side of the substantially non-porous lithium-ion-conductive membrane to provide support thereto, wherein the porous structural layer is porous LISICON layer, wherein the porous structural layer directly contacts a portion of the anode.

6. A method comprising:
generating lithium ions at a lithium-containing anode;
transporting the lithium ions through a substantially non-porous lithium-ion-conductive membrane to a cathode, wherein the substantially non-porous lithium-ion-conductive membrane comprises a LISICON membrane;
supporting the substantially non-porous lithium-ion-conductive membrane with a porous structural layer, wherein the porous structural layer is a porous LISICON layer, wherein the porous structural layer directly contacts a portion of the lithium-containing anode; and
reacting the lithium ions with elemental sulfur at the cathode to generate $Li_2S_x$, wherein the elemental sulfur and $Li_2S_x$ at least partially dissolve in at least one solvent in the cathode, wherein the cathode consists of the elemental sulfur, the $Li_2S_x$ and the at least one solvent selected to at least partially dissolve the elemental sulfur and $Li_2S_x$.

7. The method of claim 6, further comprising filling any pores of the LISICON membrane with a sealer.

8. The method of claim 6, wherein the at least one solvent consists of at least one polar solvent to at least partially dissolve the elemental sulfur and the $Li_2S_x$.

9. The method of claim 6, wherein the at least one solvent consists of an apolar solvent to dissolve the elemental sulfur and a polar solvent to dissolve the $Li_2S_x$.

10. The method of claim 6, wherein the at least one solvent consists of tetraglyme.

* * * * *